(12) United States Patent
Yamamoto et al.

(10) Patent No.: US 10,978,072 B2
(45) Date of Patent: Apr. 13, 2021

(54) DISPLAY CONTROL SYSTEM, DISPLAY CONTROL METHOD, AND COMPUTER PROGRAM PRODUCT USING DISPLAY SECTORS IN ONE REVOLUTION OF CLOCKWISE OR COUNTERCLOCKWISE DIRECTION

(71) Applicant: Kabushiki Kaisha Toshiba, Tokyo (JP)

(72) Inventors: Masahiro Yamamoto, Kawasaki Kanagawa (JP); Kosei Fume, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 90 days.

(21) Appl. No.: 15/898,146

(22) Filed: Feb. 15, 2018

(65) Prior Publication Data
US 2019/0088259 A1    Mar. 21, 2019

(30) Foreign Application Priority Data

Sep. 20, 2017    (JP) .............................. JP2017-180261

(51) Int. Cl.
| | | |
|---|---|---|
| *G10L 15/26* | (2006.01) | |
| *G06F 40/58* | (2020.01) | |
| *G01S 3/802* | (2006.01) | |
| *G10L 25/78* | (2013.01) | |
| *G10L 21/10* | (2013.01) | |
| *G06K 9/00* | (2006.01) | |
| *H04N 21/488* | (2011.01) | |

(52) U.S. Cl.
CPC ............ *G10L 15/26* (2013.01); *G06K 9/0057* (2013.01); *G06K 9/00671* (2013.01); *G10L 21/10* (2013.01); *G10L 25/78* (2013.01); *H04N 21/4884* (2013.01)

(58) Field of Classification Search
CPC ......... G06F 17/275; G10L 15/26; G01S 3/802
USPC ....................................................... 704/235
See application file for complete search history.

(56) References Cited

U.S. PATENT DOCUMENTS

| | | |
|---|---|---|
| 6,975,991 B2 | 12/2005 | Basson et al. |
| 8,183,997 B1 | 5/2012 | Wong et al. |
| 8,493,204 B2 | 7/2013 | Wong et al. |
| 9,542,958 B2 | 1/2017 | Sendai |

(Continued)

FOREIGN PATENT DOCUMENTS

| | | |
|---|---|---|
| JP | 2007-256915 | 10/2007 |
| JP | 2007-300323 | 11/2007 |

(Continued)

*Primary Examiner* — Farzad Kazeminezhad
(74) *Attorney, Agent, or Firm* — Knobbe, Martens, Olson & Bear, LLP

(57) ABSTRACT

According to an embodiment, a display control system includes a recognizer, a calculator, and a display controller. The recognizer is configured to recognize sound generated from a sound source. The calculator is configured to calculate a first direction of the sound source from a position of a user based at least in part on the recognized sound. The display controller is configured to cause a display to output display information that visually expresses the sound in a first display format determined based at least in part on an angle between a second direction in which the user faces and the first direction of the sound source.

7 Claims, 14 Drawing Sheets

(56) References Cited

U.S. PATENT DOCUMENTS

| | | | |
|---|---|---|---|
| 9,691,387 B2* | 6/2017 | Nakadai | G06F 17/275 |
| 2007/0195012 A1 | 8/2007 | Ichikawa et al. | |
| 2012/0330659 A1 | 12/2012 | Nakadai | |
| 2015/0063069 A1* | 3/2015 | Nakadai | G01S 3/802 |
| | | | 367/118 |
| 2017/0243520 A1 | 8/2017 | Teshima | |
| 2017/0295363 A1 | 10/2017 | Eita | |

FOREIGN PATENT DOCUMENTS

| | | |
|---|---|---|
| JP | 2007-334149 | 12/2007 |
| JP | 2010-154259 | 7/2010 |
| JP | 2012-108793 | 6/2012 |
| JP | 2013-008031 A | 1/2013 |
| JP | 2013-106298 | 5/2013 |
| JP | 2014-120963 | 6/2014 |
| JP | 2015-072415 | 4/2015 |
| JP | 2015-510283 | 4/2015 |
| JP | 6084728 | 2/2017 |
| WO | WO 2016/075780 A1 | 5/2016 |

\* cited by examiner

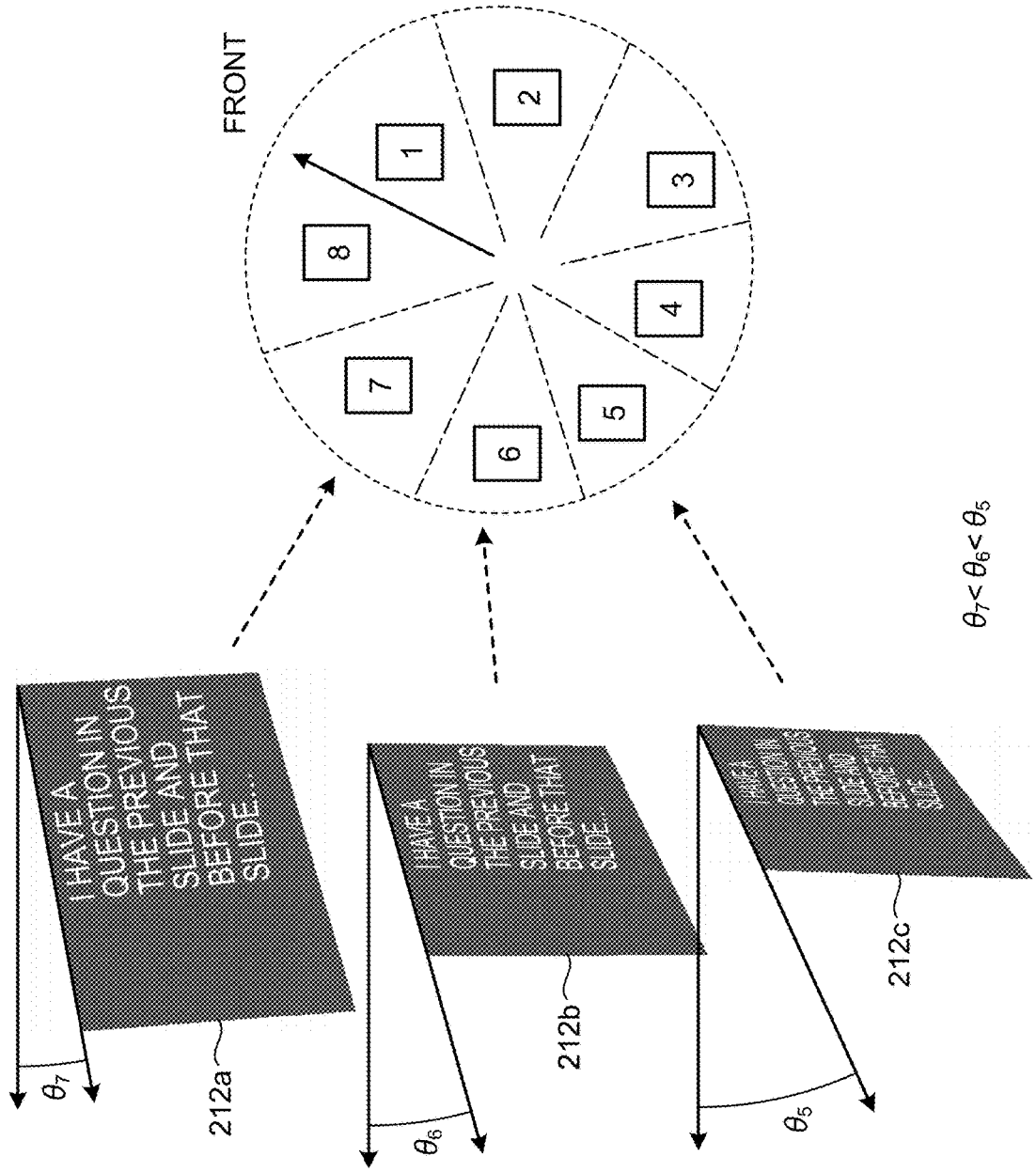

DISPLAY CONTROL SYSTEM, DISPLAY CONTROL METHOD, AND COMPUTER PROGRAM PRODUCT USING DISPLAY SECTORS IN ONE REVOLUTION OF CLOCKWISE OR COUNTERCLOCKWISE DIRECTION

CROSS-REFERENCE TO RELATED APPLICATIONS

This application is based upon and claims the benefit of priority from Japanese Patent Application No. 2017-180261, filed on Sep. 20, 2017; the entire contents of which are incorporated herein by reference.

FIELD

Embodiments described herein relate generally to a display control system, a display control method, and a computer program product.

BACKGROUND

Conventionally, a technique for displaying an image including text information expressing voice in a display device such as a head mounted display (HMD) or a smart device has been known.

In the conventional technique, however, it has been difficult to visually express a sound field including sound from a sound source out of a user's field of vision.

BRIEF DESCRIPTION OF THE DRAWINGS

FIG. 6A is a diagram illustrating an example of a method of determining a display format (in a counterclockwise direction) according to the first embodiment;

DETAILED DESCRIPTION

According to an embodiment, a display control system includes a recognizer, a calculator, and a display controller. The recognizer is configured to recognize sound generated from a sound source. The calculator is configured to calculate a first direction of the sound source from a position of a user based at least in part on the recognized sound. The display controller is configured to cause a display to output display information that visually expresses the sound in a first display format determined based at least in part on an angle between a second direction in which the user faces and the first direction of the sound source.

Embodiments of a display control system, a display control method, and a program will hereinafter be described in detail with reference to the attached drawings.

First Embodiment

Figure 1:
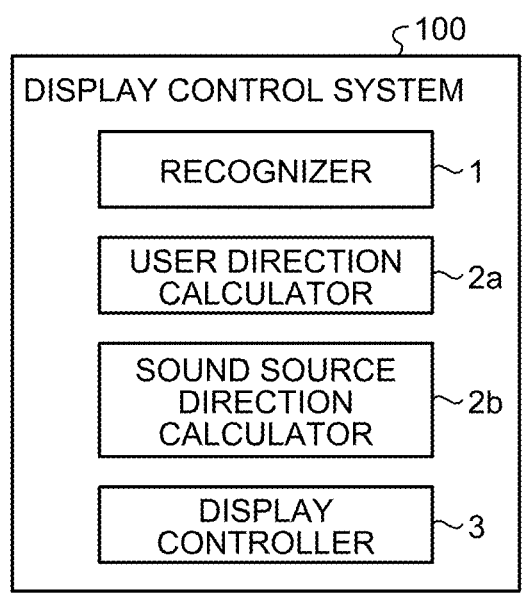
FIG. 1 is a diagram illustrating an example of a function structure of a display control system according to a first embodiment.

A first embodiment will be described below.
Example of Function Structure
FIG. 1 is a diagram illustrating an example of a function structure of a display control system according to the first embodiment. A display control system 100 according to the first embodiment includes a recognizer 1, a user direction calculator 2a, a sound source direction calculator 2b, and a display controller 3.

The recognizer 1 recognizes sound generated from a sound source. If the sound generated from the sound source is recognized as voice, for example, the recognizer 1 generates text information expressing the voice.

The user direction calculator 2a calculates a reference direction vector indicating a direction in which the user faces assuming that the user's position corresponds to the origin. Based on the recognized sound, the sound source direction calculator 2b calculates a sound source direction vector indicating a direction of the sound source similarly from the original position at which the user is present.

The display controller 3 causes a display to output display information that visually expresses sound in a first display format that is determined based on the angle between the reference direction vector and the sound source direction vector. The first display format will be described below.

The display controller 3 divides the range of the angle between the reference direction vector and the sound source direction vector into a plurality of sectors on a predetermined division basis, and if the reference direction vector and the sound source direction vector are included in the same sector, the display information that visually expresses the sound is displayed in the display in a second display format. The second display format will be described below.

Note that the structure of the display control system 100 is not limited to the structure described above. The display control system 100 may further include a microphone that collects sounds around the user, an input unit that receives the input operation of the user, the display that displays the display information, a communication unit that communicates with another device, and the like.

The display control system 100 including functional blocks described above may be achieved by one device or a plurality of devices. The functional blocks with the same function may be provided in a plurality of devices.

Figure 2:
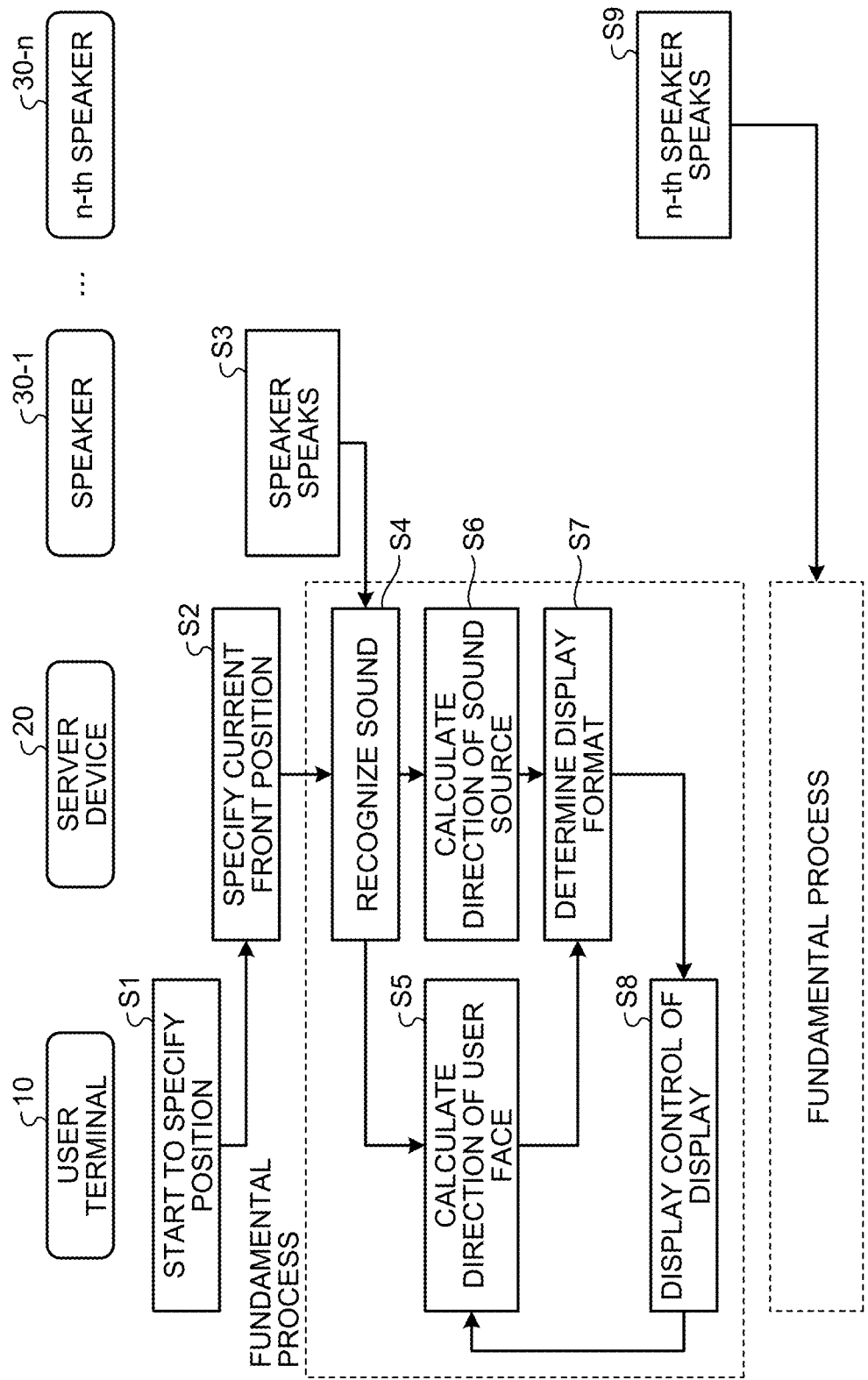
FIG. 2 is a diagram illustrating an example of a display control method according to the first embodiment.

FIG. 2 is a diagram for describing an example of a display control method according to the first embodiment.

The device structure of the display control system 100 may be determined arbitrarily. In the first embodiment, the display control device system 100 is configured to include a user terminal 10 and a server device 20.

Note that the user terminal 10 may be arbitrarily selected. The user terminal 10 may be, for example, an HMD, a monocular display, a smart device, or the like.

The HMD is a device that the user wears on his head, and that can display a virtual space image indicating a virtual reality (VR) space, an augmented reality (AR) space, or the like. The HMD has, for example, a semi-transparent screen. In general, the HMD used for the mixed reality (MR) can overlap a real image (including an image of a camera) and arbitrary display information. Therefore, the screen that covers the field of vision can show a real situation.

The monocular display is a device that displays information on one eye. The monocular display is used as a display that can display information in the space on the visual line.

The smart device is, for example, a smart phone, a tablet terminal, or the like.

When the user terminal 10 is the HMD, the monocular display, or the like, the direction in which the user faces, which is indicated by the above-described reference direction vector, corresponds to the direction of the user's face. The direction of the face can be detected by outside-in tracking, inside-out tracking, or both. In the description of the first embodiment, for example, the inside-out tracking method is employed.

When the user terminal 10 is a smart device, the direction in which the user faces, which is indicated by the above-described reference direction vector, corresponds to the direction that the body of the user who holds the smart device in his hand faces.

First, in response to the input operation of the user or the like, the user terminal 10 requests the server device 20 to specify (identify) the current front position (Step S1). How to specify the current front position may be arbitrarily determined. For example, the current front position may be specified in a manner that the display of the user terminal 10 displays that the process of specifying the current front position is started and the display receives the pressing of a decision button or the like in a state that the user faces in an arbitrary direction.

Next, the user direction calculator 2a of the server device 20 calculates the reference direction vector for specifying the current front position (Step S2).

Next, when a speaker 30-1 speaks (Step S3), the recognizer 1 of the server device 20 recognizes the sound generated from the speaker 30-1 corresponding to the sound source (Step S4). The recognizer 1 of the server device 20 receives sound information expressing the sound collected by, for example, a microphone attached to the user through the network, and thus recognizes the sound expressed by the sound information.

Next, the user direction calculator 2a of the user terminal 10 calculates the reference direction vector indicating the direction in which the user faces (Step S5). Next, the sound source direction calculator 2b of the server device 20 calculates the sound source direction vector indicating the direction of the sound source of the sound recognized by the process in Step S4 (Step S6).

Next, the display controller 3 of the server device 20 determines the display format of the display information that visually expresses the sound recognized by the process of Step S4 (Step S7).

Next, the display controller 3 of the user terminal 10 performs the display control to cause the display to display the display information that visually expresses the sound in the display format determined in the process of Step S7 (Step S8).

The process from Step S4 to Step S8 described above is the fundamental process of the display control system 100.

Next, when an n-th speaker 30-n speaks (Step S9), the display control system 100 performs the above-described fundamental process in a manner similar to the case where the speaker 30-1 speaks.

Figure 3:
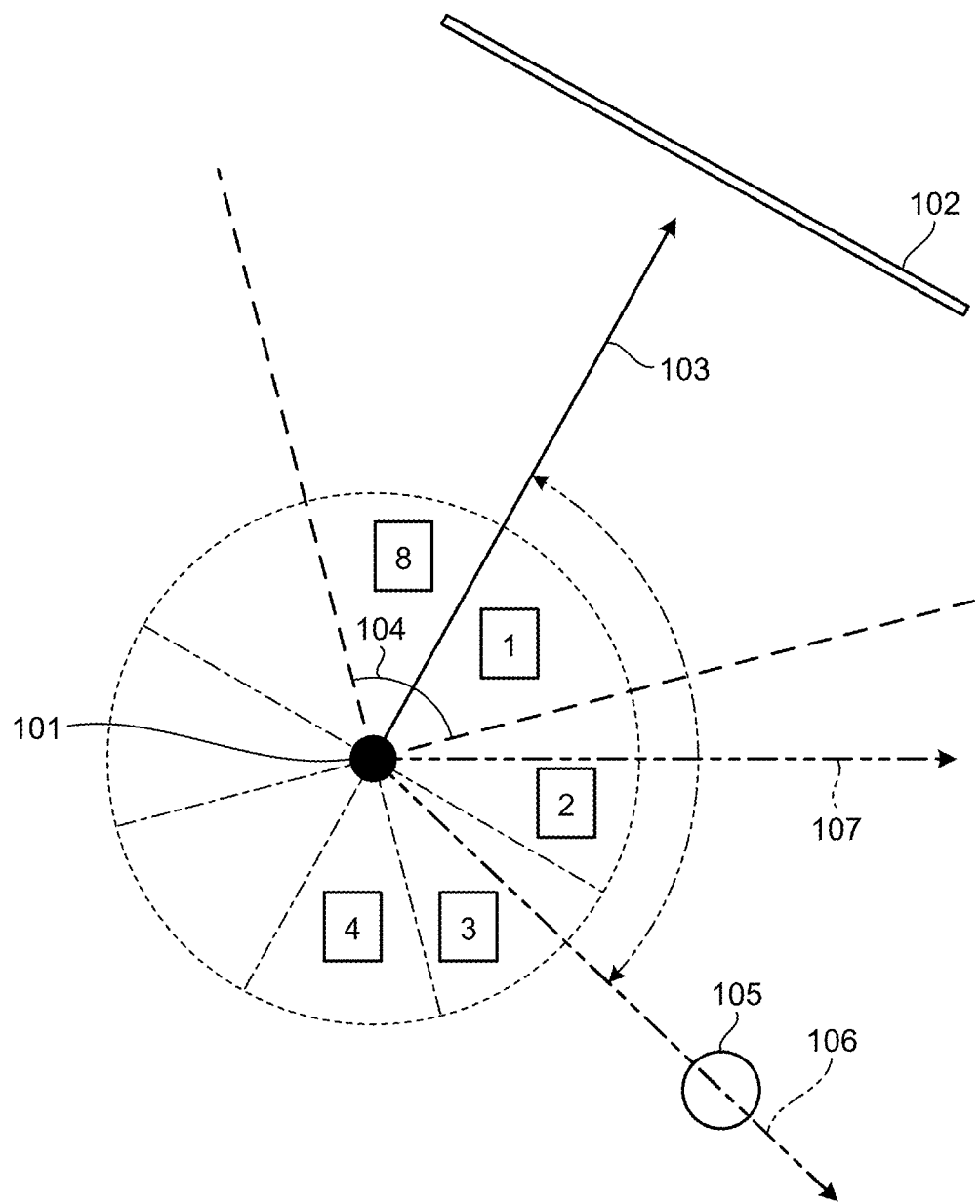
FIG. 3 is a diagram illustrating an example of a method of specifying a sound source position according to the first embodiment.

FIG. 3 is a diagram illustrating an example of a method of specifying a sound source position according to the first embodiment. In the example of FIG. 3, a reference direction vector 103 indicates a reference direction in the case where a user 101 looks at a stage 102 in front of the user 101. An angle 104 corresponds to the standard viewing angle (90 degrees) of the user 101. In addition, in the example of FIG. 3, the divisional range of the angle between the reference direction vector 103 and a sound source direction vector 106 expressing a direction of a sound source 105 is divided into eight sectors (grids) of 45 degrees each. How to divide the divisional region may be determined arbitrarily.

In the example of FIG. 3 which includes the sound source direction vector, the reference direction vector 103 is positioned in a first grid start region. In this case, the user 101 can capture the sound source 105 in his view by turning to the direction indicated by a vector 107.

In the example of FIG. 3, the divisional range is divided into the first to the eighth grids. Therefore, assuming that the user 101 is turned from the direction closer to the sound source 105, the rotating angle (rotating distance) can be set approximately in the second to the fourth grids in the clockwise direction. In the example of FIG. 3, the sound source 105 is in the third grid; therefore, in this example, the rotating angle necessary for the user to capture the sound source 105 in front of the user is approximately in the range of 90 to 135 degrees.

When the sound source 105 is in any of the second grid to the seventh grid, the display controller 3 displays the display information that visually expresses the sound in accordance with the position of that grid. When the user 101 faces in the direction of the sound source 105, the original front position where the stage 102 exists is important as the place where the stage is set; therefore, for example, it is also possible to automatically calculate the front position as the original position of the front speaker on the basis of a new reference direction vector. In the example of FIG. 3, the rotating angle can be obtained in the equally divided eight grids of the angle range and thus, the position of the sound source 105 can be measured with robustness. In this case, by using two or three microphones, the position of the sound source 105 can be specified.

Figure 4:
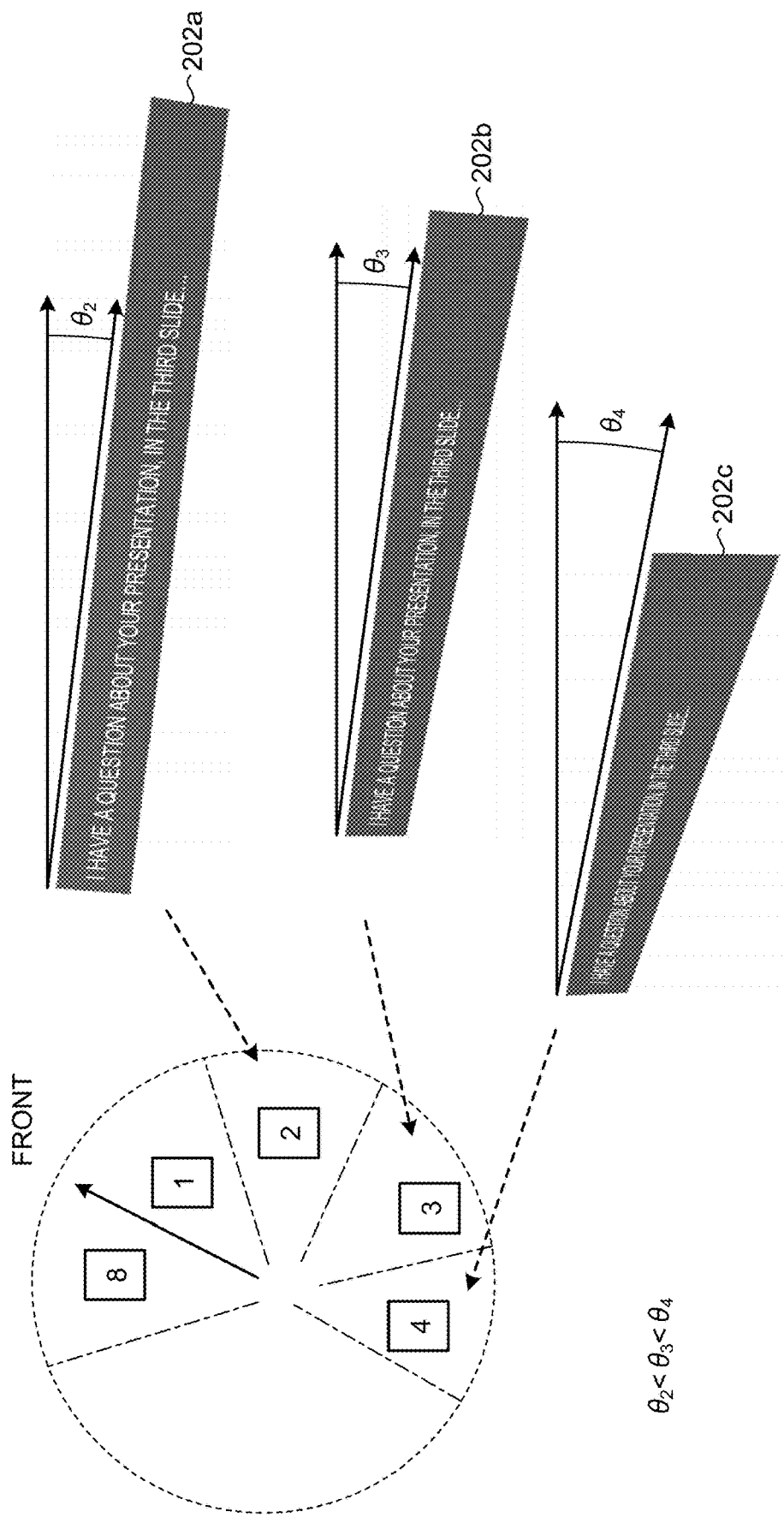
FIG. 4 is a diagram illustrating an example of a method of determining a display format (in a clockwise direction) according to the first embodiment.

FIG. 4 is a diagram illustrating an example of a method of determining the display format (in the clockwise direction) according to the first embodiment. In an example of FIG. 4, the recognized sound is voice and the text information that visually expresses the sound is formed.

In this example, display information 201 that visually expresses the sound is displayed in the second display format described above and display information 202a to 202c that visually expresses the sound is displayed in the first display format described above.

The angle $\theta_2$ is used when the user faces the front and the sound source is in the second grid. The angle $\theta_3$ is used when the user faces the front and the sound source is in the third grid. The angle $\theta_4$ is used when the user faces the front and the sound source is in the fourth grid. The angles satisfy the relation of $\theta_2<\theta_3<\theta_4$, and as the rotating angle from the direction that the user faces (from the front) is larger, the text information is formed more. The display controller 3 determines the first display format on the basis of the sector including the sound source direction vector and the reference direction vector.

Figure 5:
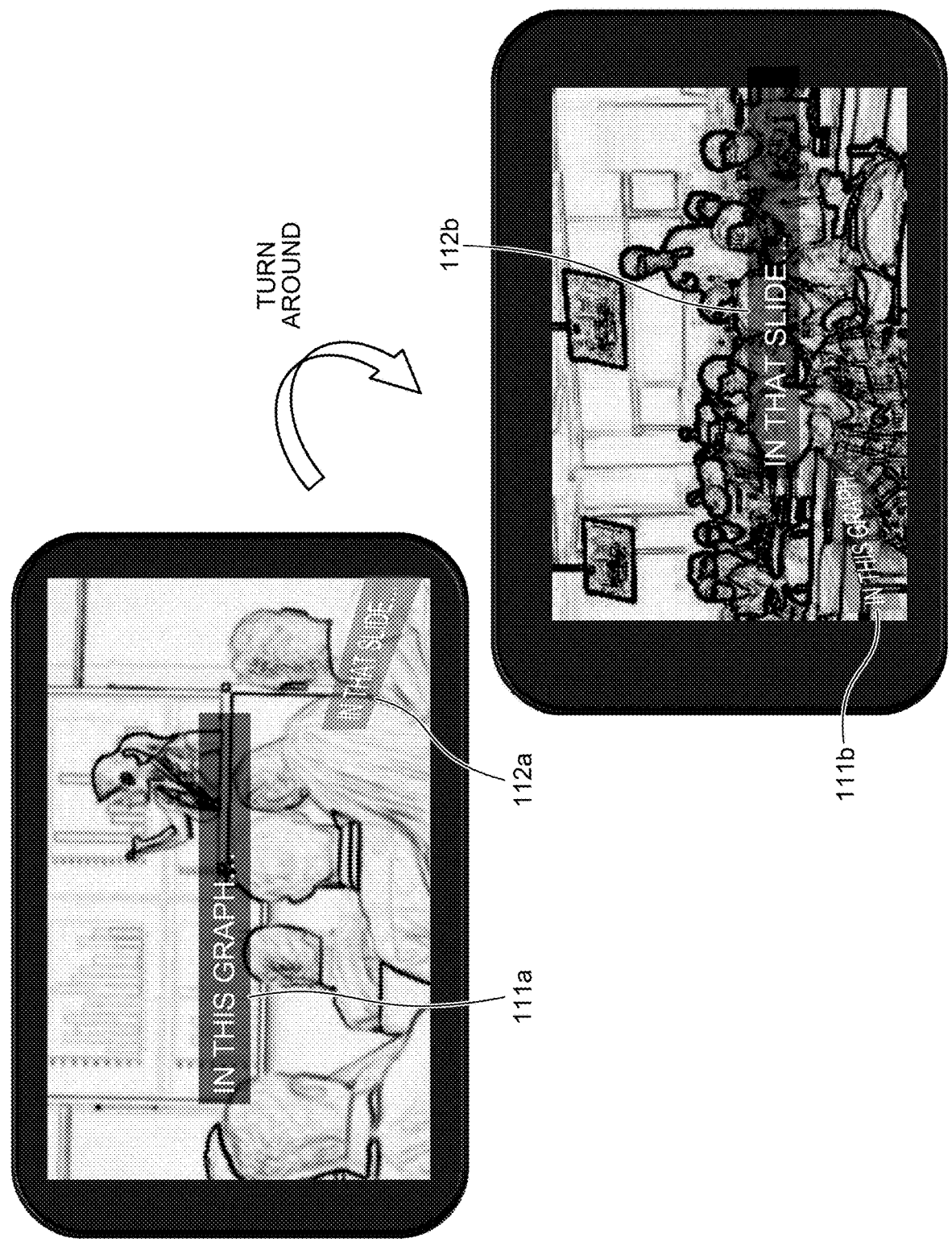
FIG. 5 is a diagram illustrating Example 1 of display control according to the first embodiment.

FIG. 5 is a diagram illustrating Example 1 of the display control according to the first embodiment. In a presentation at a conference, for example, the audience may want to ask the speaker a question. In this case, the display control system 100 according to the first embodiment can provide the barrier-free environment to a person with hearing difficulties, for example. For users with hearing difficulties, exactly displaying the time, the place, and the content are essential for providing the minimum compensation of the voice information. In the display control system 100 according to the first embodiment, the non-voice effective information and the voice information around the user can be displayed as appropriate in accordance with the direction in which the user faces (the face direction, for example).

First, the user direction calculator 2a calculates the reference direction vector indicating the direction in which the user faces. The display controller 3 causes the display to output display information 111a that visually expresses the voice of the speaker in front of the user in the second display format described above.

When a questioner behind the user on the right side has asked a question, the recognizer 1 recognizes the voice expressing the question. Next, based on the recognized voice, the sound source direction calculator 2b calculates the sound source direction vector that indicates the direction of the questioner from the user's position. The display controller 3 causes the display to output display information 112a that visually expresses the voice of the questioner in the first display format determined based on the sector including the sound source direction vector and the reference direction vector.

When the question is asked, the display controller 3 performs the display of the text information or the selected display of the text information (display information 112a) from the direction that minimizes the rotation of the user. The display controller 3 displays the easy-to-read text information (display information 112b) after the user's face is turned to the questioner. Here, the speaker is present at the position opposite to the rotating direction; therefore, the display controller 3 changes the display accordingly (display information 111b).

Figure 6B:
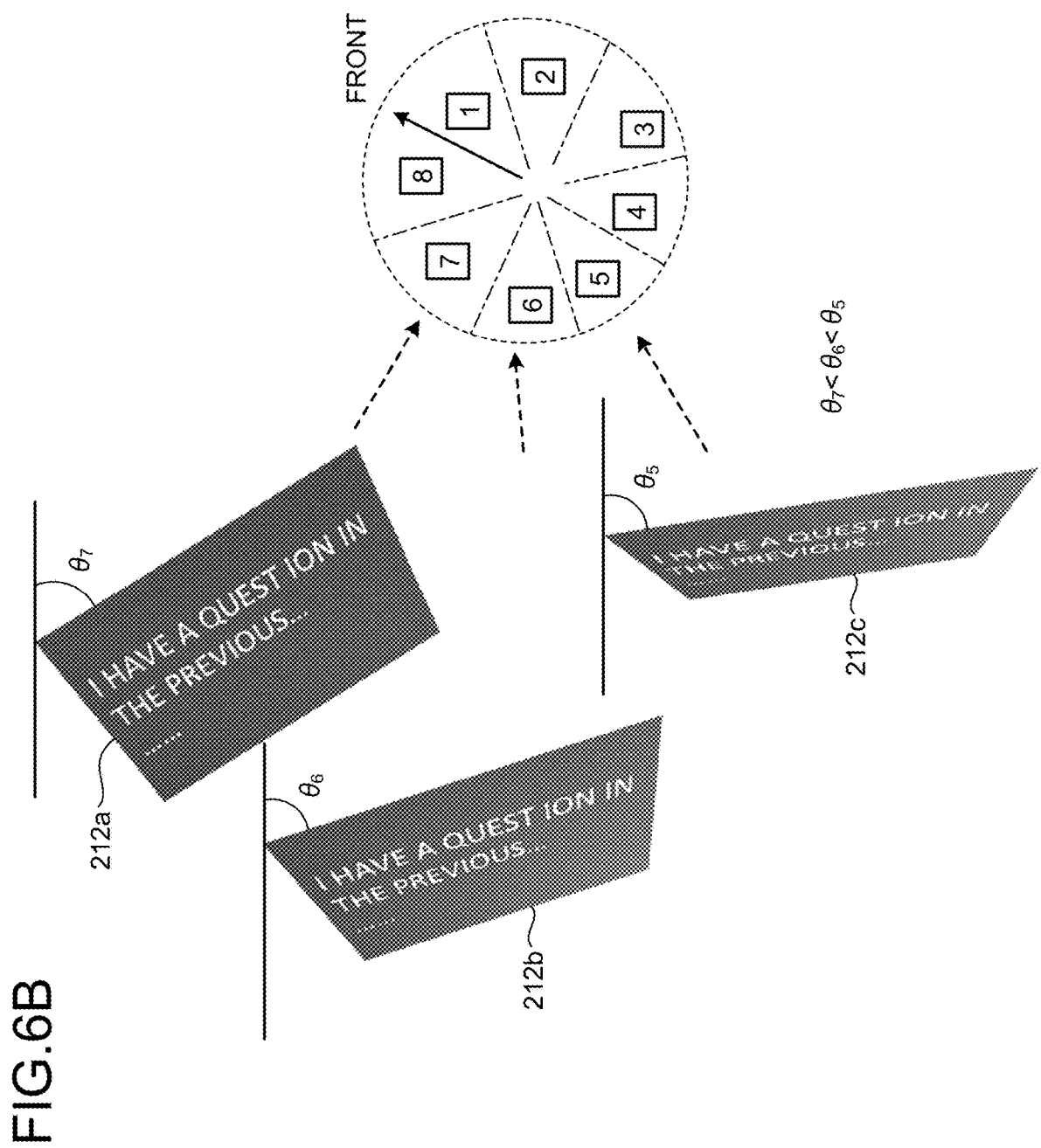
FIG. 6B is a diagram illustrating an example of a method of determining a display format (in a counterclockwise direction) according to the first embodiment.

FIGS. 6A and 6B are diagrams illustrating examples of a method of determining the display format (in the counterclockwise direction) according to the first embodiment. In examples of FIGS. 6A and 6B, the recognized sound is voice and the text information that visually expresses the sound is formed.

In these examples, display information 212a to 212c that visually expresses sound is displayed in the first display format described above. When the display information 212a to 212c to propel the user to turn to the left is displayed, if the letters are shown horizontally, the display controller 3 cannot display the beginning of the string; therefore, in this case, the display controller 3 displays the text information vertically (FIG. 6B) or vertically spread (FIG. 6A) to make it easier to read.

The angle $\theta_7$ is used when the user faces the front and the sound source is in the seventh grid. The angle $\theta_6$ is used when the user faces the front and the sound source is in the sixth grid. The angle $\theta_5$ is used when the user faces the front and the sound source is in the fifth grid. The angles satisfy the relation of $\theta_7<\theta_6<\theta_5$, and as the rotating angle from the direction in which the user faces (from the front) is larger, the text information is formed more. The display controller 3 determines the first display format on the basis of the sector including the sound source direction vector and the reference direction vector.

Figure 7:
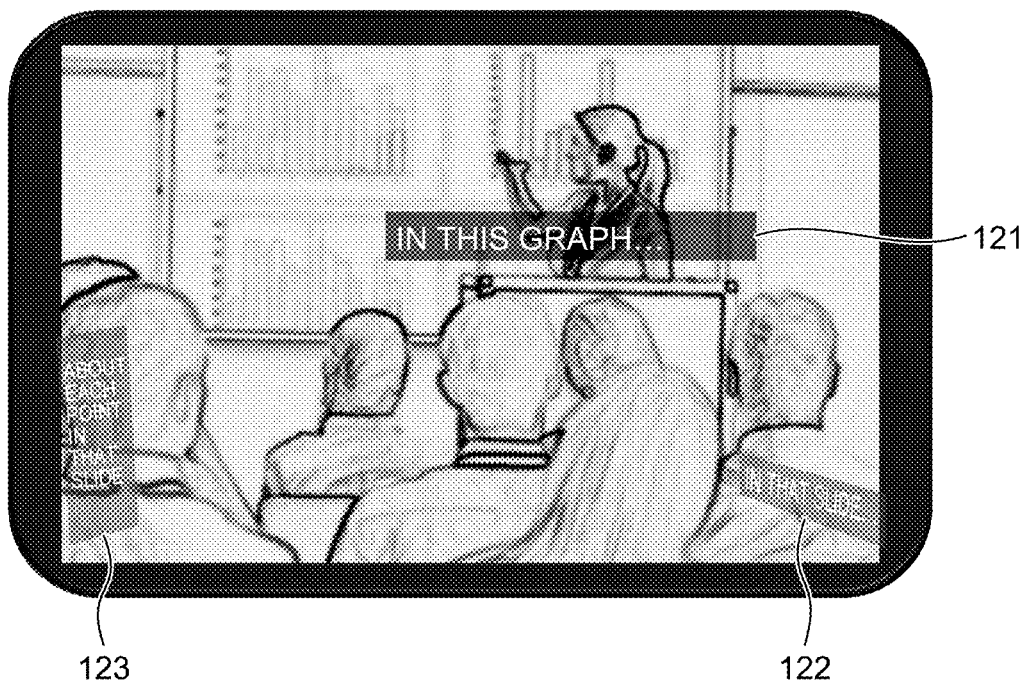
FIG. 7 is a diagram illustrating Example 2 of the display control according to the first embodiment.

FIG. 7 is a diagram illustrating Example 2 of the display control according to the first embodiment. First, the user direction calculator 2a calculates the reference direction vector expressing the direction in which the user faces. The display controller 3 causes the display to output display information 121 that visually expresses the voice of the speaker in front of the user in the second display format described above.

If a questioner behind the user on the right side has asked a question, the recognizer 1 recognizes the voice expressing the question. Next, based on the recognized voice, the sound source direction calculator 2b calculates the sound source direction vector indicating the direction of the questioner from the user's position. Then, in accordance with the second display format determined based on the sector including the sound source direction vector and the reference direction vector, the display controller 3 causes the display to display horizontally display information 122 that visually expresses the questioner's voice.

On the other hand, if the questioner behind the user on the left side has asked a question, the recognizer 1 recognizes the voice indicating the question. Next, based on the recognized voice, the sound source direction calculator 2b calculates the sound source direction vector indicating the direction of the questioner from the user's position. Then, in accordance with the second display format determined based on the sector including the sound source direction vector and the reference direction vector, the display controller 3 causes the display to display vertically display information 123 that visually expresses the questioner's voice.

Since the display controller 3 performs the display control of the display information 122 and 123 by changing the direction of letters as illustrated in FIG. 7, the user can know the direction of the questioner more intuitively.

Figure 8A:
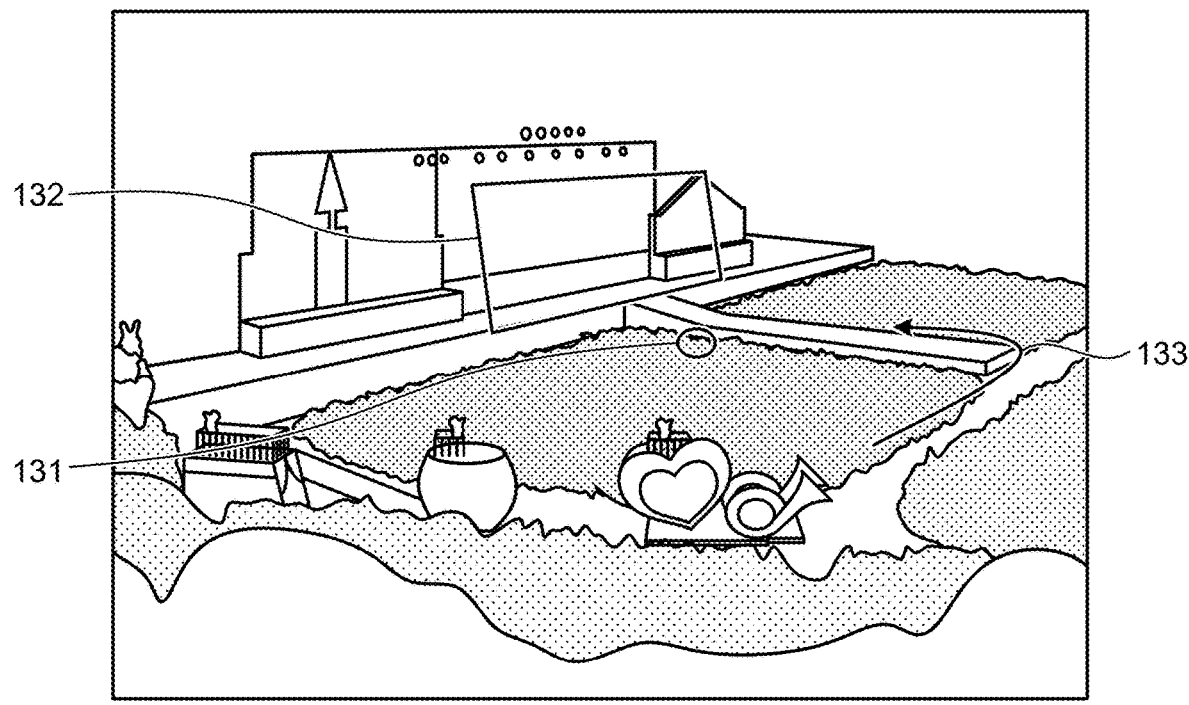
FIG. 8A is a diagram illustrating Example 3 of the display control according to the first embodiment.
Figure 8B:
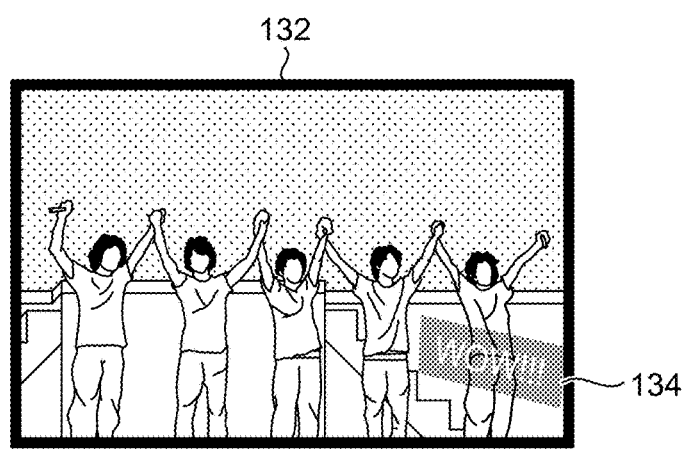
FIG. 8B is a diagram illustrating Example 3 of the display control according to the first embodiment.

FIG. 8A and FIG. 8B are diagrams illustrating Example 3 of the display control according to the first embodiment. In the examples of FIG. 8A and FIG. 8B, the display control system 100 according to the first embodiment is used in a concert venue. A display region 132 is a region to be displayed in the display. An artist is usually on the stage of the concert venue included in the display region 132, that is, in front of a user 131. If the concert venue has a passage 133 that extends from the stage through the audience, the artist may walk on the passage 133.

In the display control system 100 according to the first embodiment, the shouts of joy or the like when the artist walks on the passage 133 can be displayed by display information 134. This enables a person with hearing difficulties to enjoy the shouts of joy based on the behavior of the artist who is not in the front position but is on the passage 133. When the shouts of joy have risen at an arbitrary angle behind the user, the display controller 3 displays the display information 134 to guide the user to the angle with the arrangement that reduces the rotating angle of the user (for example, one of left and right). The user having seen the display information 134 turns to the direction suggested by the display information 134 to face in that direction.

As described above, in the display control system 100 according to the first embodiment, the sound field including the sound from the sound source even out of the user's field of vision can be visually expressed. For example, by the display information displayed by the display controller 3, the user can know the content of the sound while confirming with his eyes where the sound such as the peripheral sound comes from. That is to say, the user can know the sound field around the user only with the vision more intuitively, and the user can feel more the environment around the user with the vision.

Modification of First Embodiment

Next, a modification of the first embodiment is described. In the modification of the first embodiment, the part that is similar to the first embodiment is not described and the part different from the first embodiment is described.

Figure 9:
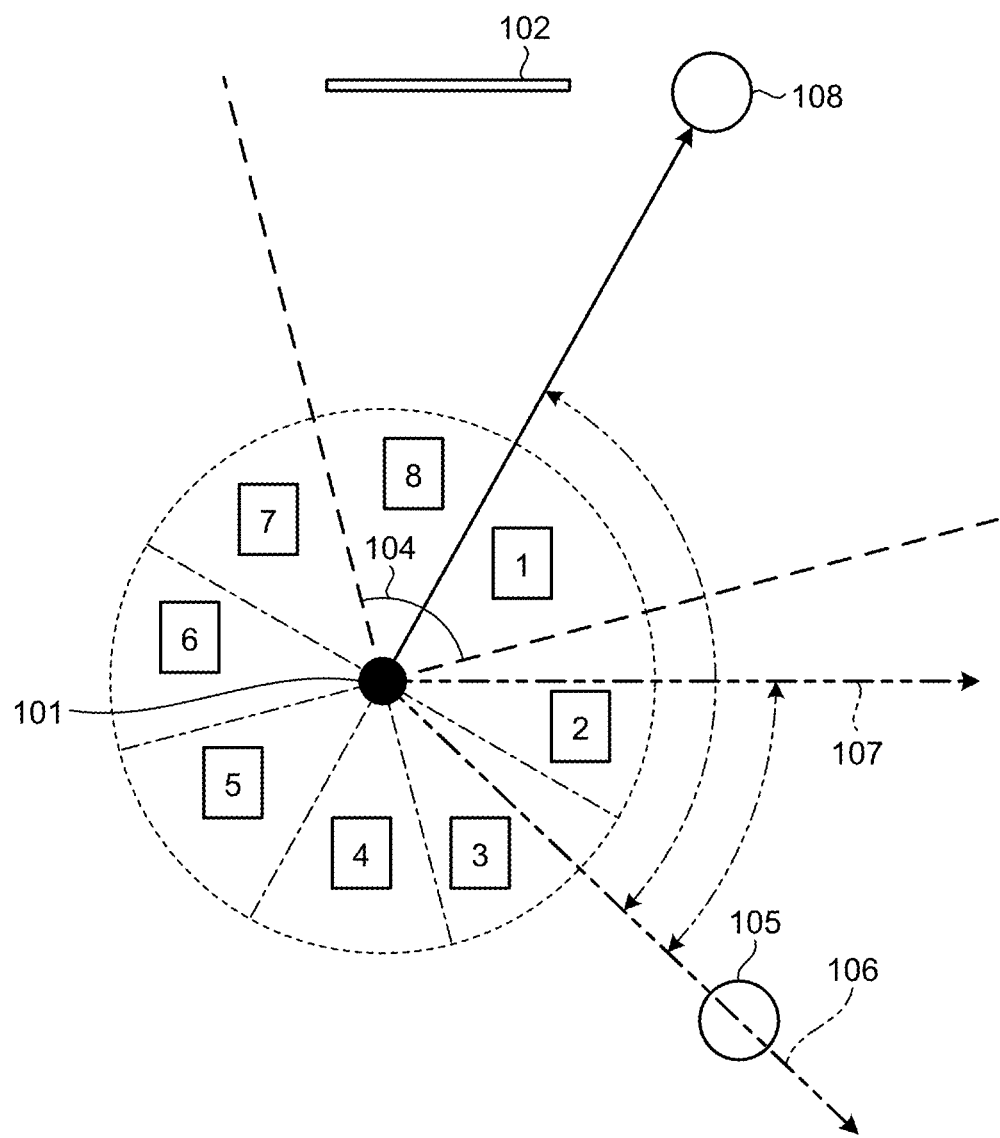
FIG. 9 is a diagram illustrating an example of a method of specifying a sound source position in a modification of the first embodiment.

FIG. 9 is a diagram illustrating an example of a method of specifying a sound source position in the modification of the first embodiment. The display controller 3 specifies the position of the questioner (sound source 105) in the sectors of the first grid to the eighth grid when the speaker (sound source 108) near the stage 102 is in the front position. In the modification of the first embodiment, the display controller 3 needs the positional relation to the speaker (sound source 108) when the user looks at the questioner (sound source 105); therefore, a new reference axis is created as a questioner axis. Then, the display controller 3 maintains the position of the questioner (sound source 105) and the position of the speaker (sound source 108) at the relative angle. This enables the display controller 3 to specify the direction of the speaker (sound source 108) and the direction of the questioner (sound source 105) by the minimum display control in the display control system 100 in the modification of the first embodiment.

Second Embodiment

Next, a second embodiment is described. In the second embodiment, the part that is similar to the first embodiment is not described and the part different from the first embodiment is described.

Figure 10:
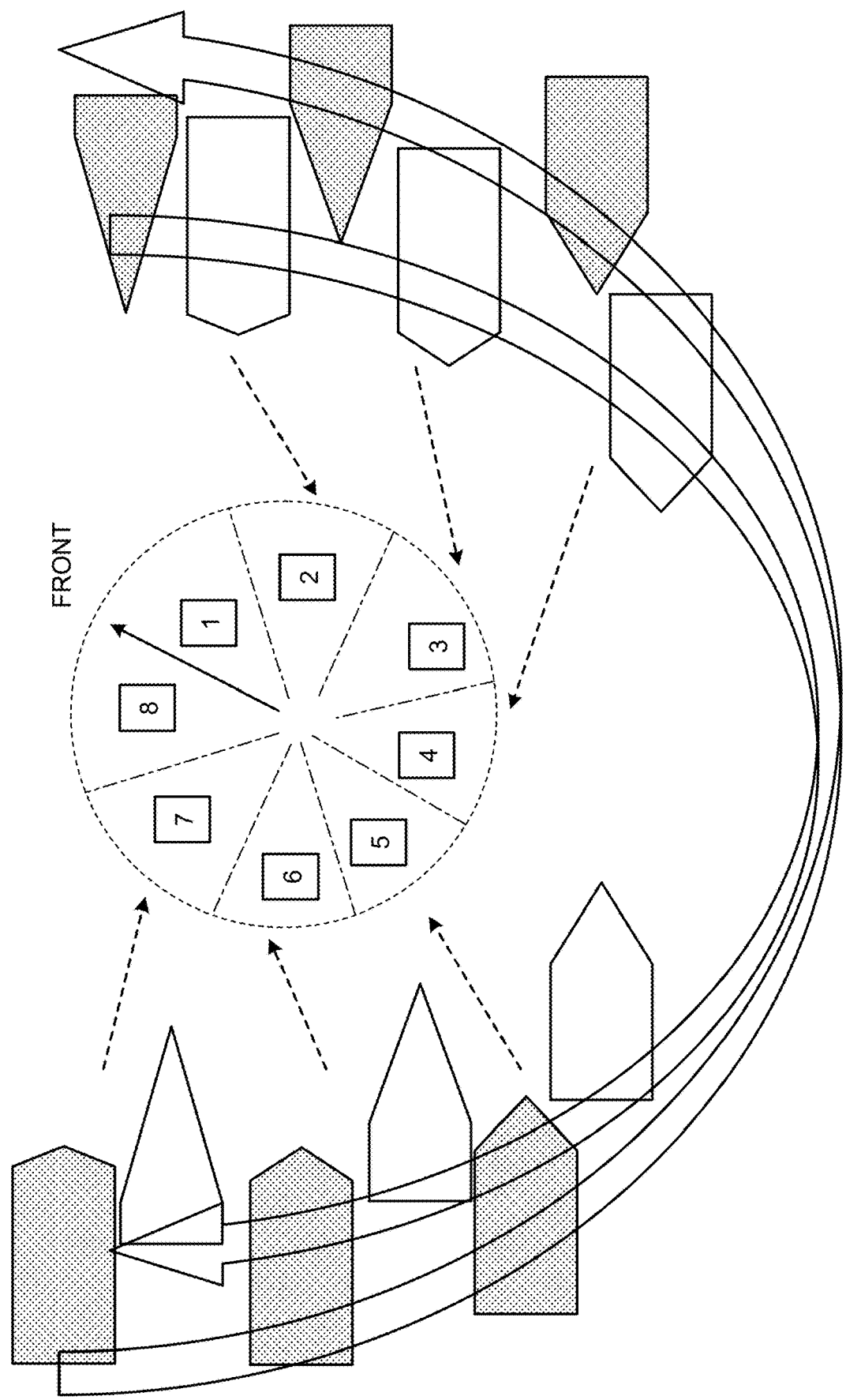
FIG. 10 is a diagram illustrating an example of a method of determining a display format according to a second embodiment.

FIG. 10 is a diagram illustrating an example of a method of determining the display format according to the second embodiment. In the example of FIG. 10, the display controller 3 uses as the first display format, a figure (mark) that is formed depending on the angle between the reference direction vector expressing the direction in which the user faces, and the sound source direction vector expressing the direction of the sound source. FIG. 10 illustrates the degree of formation by the clockwise distance around the user, and the degree of formation by the counterclockwise distance around the user.

The degree of formation of the figure expresses the relation with the rotation angle from the front. Therefore, for example, as an end of the figure has the more obtuse angle, the direction of the sound source is closer from the direction of the front, and as the end of the figure has the sharper angle, the direction of the sound source is farther from the front direction. As a result, if the number of sound sources is one, the display information displayed horizontally in the lower part of the screen in the first display format has the larger angle on one side.

Figure 11:
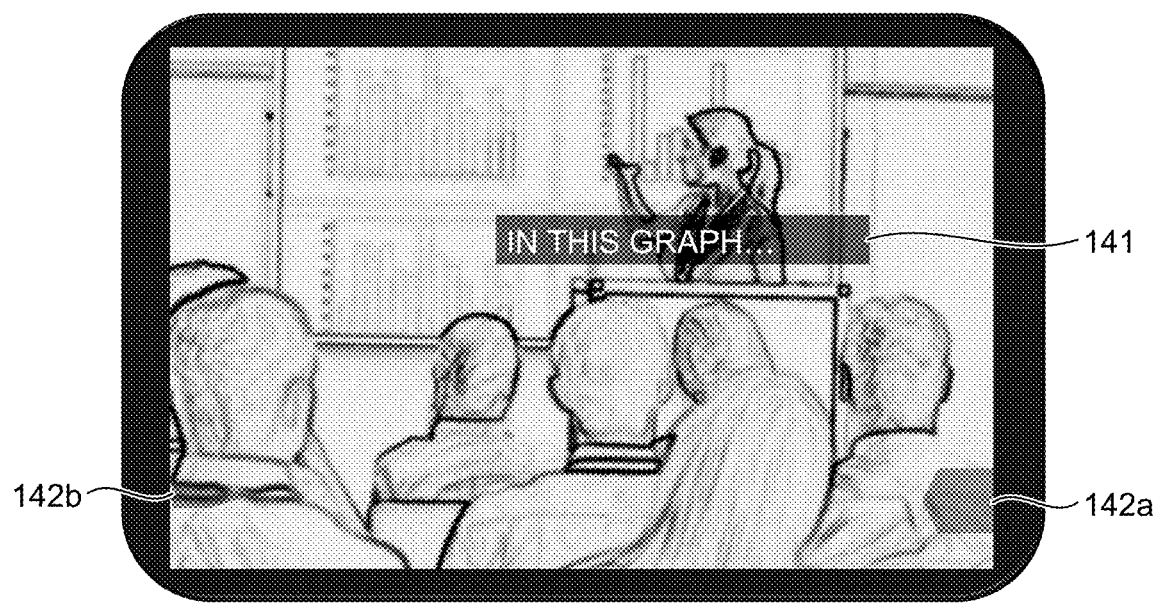
FIG. 11 is a diagram illustrating an example of display control according to the second embodiment.

FIG. 11 is a diagram illustrating an example of the display control according to the second embodiment. In the example of FIG. 11, the display controller 3 uses the figures with the convex end to form the first display format. Display information 141 visually expresses the voice of the speaker in the front position. Display information 142a and 142b visually expresses that the questioner in the third grid has asked a question.

The shape of the display information 142a expresses the case in which the user turns right to face the third grid. That is to say, the shape of the display information 142a expresses that, when the user turns right, the direction of the questioner is two grids away from the user's standard viewing angle.

On the other hand, the shape of the display information 142b expresses the case in which the user turns left to face the third grid. That is to say, the shape of the display information 142b expresses that, when the user turns left, the direction of the questioner is five grids away from the user's standard viewing angle.

Note that the display controller 3 may show the direction of the questioner (sound source) by changing the size, the color, or the like of the display information 142a and 142b.

As described above, in the display control system 100 according to the second embodiment, the display controller 3 uses as the first display format, a figure that is formed depending on the angle between the reference direction vector expressing the direction in which the user faces, and the sound source direction vector indicating the direction of the sound source. Thus, in the display control system 100 according to the second embodiment, the effect similar to that of the display control system 100 according to the first embodiment can be obtained.

Modification of Second Embodiment

Next, a modification of the second embodiment is described. In the modification of the second embodiment, the part that is similar to the second embodiment is not described and the part different from the second embodiment is described.

Figure 12:
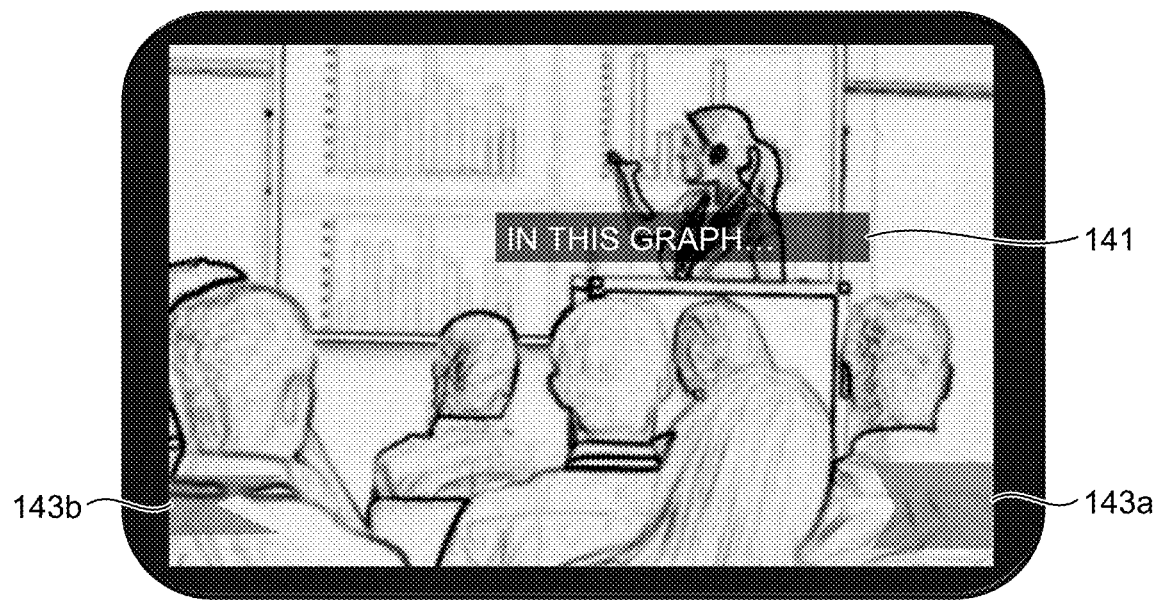
FIG. 12 is a diagram illustrating an example of display control in a modification of the second embodiment.

FIG. 12 is a diagram illustrating an example of the display control in the modification of the second embodiment. The display controller 3 in the modification of the second embodiment uses the figures with the concave end to form the first display format as illustrated in FIG. 12. The display information 141 visually expresses the voice of the speaker in the front position. Display information 143a and 143b visually expresses that the questioner in the third grid has asked a question.

The shape of the display information 143a expresses the case in which the user turns right to face the third grid. That is to say, the shape of the display information 143a expresses that, when the user turns right, the direction of the questioner is two grids away from the user's standard viewing angle.

On the other hand, the shape of the display information 143b expresses the case in which the user turns left to face the third grid. That is to say, the shape of the display information 143b expresses that, when the user turns left, the direction of the questioner is five grids away from the user's standard viewing angle.

Note that the display controller 3 may show the direction of the questioner (sound source) by changing the size, the color, or the like of the display information 143a and 143b. For example, as described in the above example, it is important that the shape including the size is in relation with the position of the grid and the user can set oppositely if he wants.

Third Embodiment

Next, a third embodiment is described. In the third embodiment, the part that is similar to the first embodiment is not described and the part different from the first embodiment is described.

Figure 13:
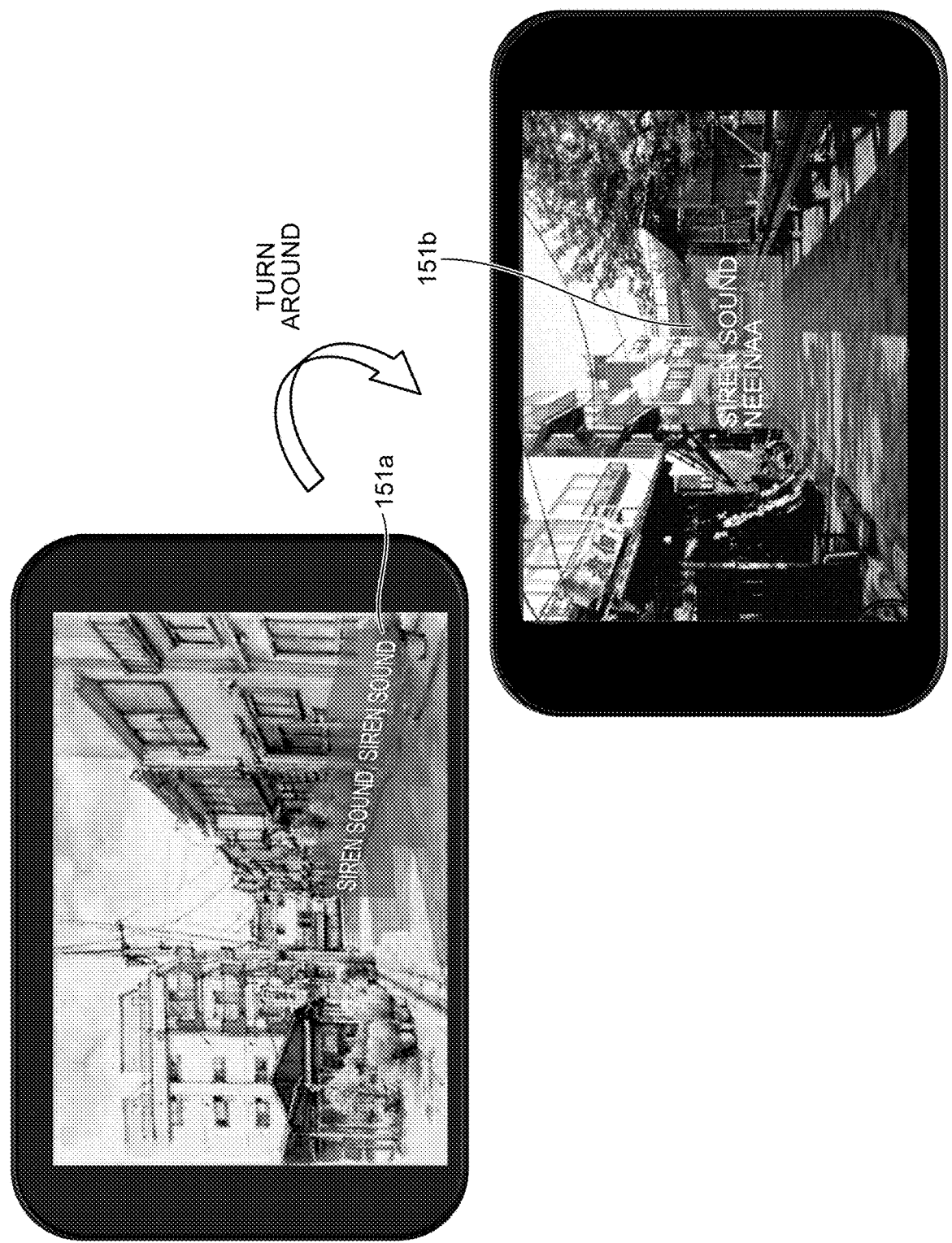
FIG. 13 is a diagram illustrating an example of display control according to a third embodiment.

FIG. 13 is a diagram illustrating an example of display control according to the third embodiment. For example, in regard to a special sound such as a siren, by specifying a sound source position around a person with hearing difficulties carrying a smart device, he can be helped by display information 151a. In the example of FIG. 13, people including the person with hearing difficulties are notified of the direction of siren by the display control to show the display information 151a in addition to an image displayed in a camera mode.

Since the siren sound basically has frequencies from 700 Hz to 1500 Hz with some fixed cycles, the smart phone can notify him/her of the warning sound source on the basis of the frequency or the cycle of this siren. In this case, for example, the application of the display control system 100 is started as the background application of the smart phone. Thus, when the siren sound is input through a microphone, the display control system 100 displays the direction of the sound source suitably using an electronic compass and a gyroscope of the smart phone. In this case, for example, the smart phone notifies the detection of the siren sound by vibration first, and then displays the display information 151a expressing the direction of the siren on the screen. The person with hearing difficulties puts the smart phone to the direction of the siren to obtain the explanation in text by display information 151b.

As described above, in the display control system 100 according to the third embodiment, the display controller 3 causes the display to display the display information that visually expresses the sound source position of the sound on the basis of the frequency or the cycle of the particular sound such as the siren sound. Thus, the display control system 100 according to the third embodiment can help the person with hearing difficulties.

Finally, a hardware structure of the display control system 100 according to any of the first to third embodiments is described.

Example of Hardware Structure

Figure 14:
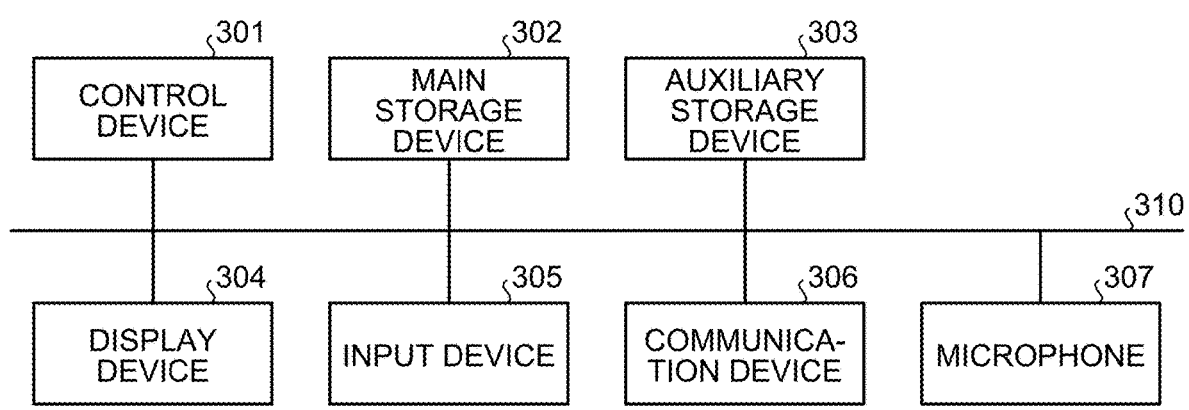
FIG. 14 is a diagram illustrating an example of a hardware structure of any of first to third display control systems.

FIG. 14 is a diagram illustrating an example of a hardware structure of the display control system 100 according to any of the first to third embodiments. The display control system 100 includes a control device 301, a main storage device 302, an auxiliary storage device 303, a display device 304, an input device 305, a communication device 306, and a microphone 307. The control device 301, the main storage device 302, the auxiliary storage device 303, the display device 304, the input device 305, the communication device 306, and the microphone 307 are connected to each other through a bus 310.

The display device 304, the input device 305, and the microphone 307 may be omitted. For example, if the display control system 100 is connected to another device such as a smart device through the communication device 306, a display, an input unit, and a microphone of the connected device may be used.

The control device 301 executes programs developed from the auxiliary storage device 303 to the main storage device 302. The control device 301 is one or more processors, and one example thereof is a CPU. The main storage device 302 is a memory such as a read only memory (ROM) or a random access memory (RAM). The auxiliary storage device 303 is a memory card, a hard disk drive (HDD), a solid state drive (SSD), or the like.

The display device 304 displays information. The display device 304 may be, for example, a liquid crystal display or an organic EL display with or without a curved surface. The input device 305 receives the input of information. The input device 305 may be a hardware key, for example. The display device 304 and the input device 305 may be a liquid crystal touch panel having both the display function and the input function. The communication device 306 communicates with another device.

The programs to be executed in the display control system 100 are stored in a computer-readable storage medium such as a CD-ROM, a memory card, a CD-R, or a digital versatile disc (DVD) in the installable format or the executable format, which may be provided as a computer program product.

The programs to be executed in the display control system 100 may be stored in a computer connected to the network such as the Internet, and downloaded via the network. Alternatively, the programs to be executed in the display control system 100 may be provided via the network such as the Internet without being downloaded.

Furthermore, the programs to be executed in the display control system 100 may be provided by being incorporated in advance in a ROM or the like.

The programs to be executed in the display control system 100 have a module configuration including the function that can be achieved by programs among the functions of the display control system 100.

The function to be achieved by the programs is loaded on the main storage device 302 in a manner that the control device 301 reads out the programs from the storage medium such as the auxiliary storage device 303 and executes the programs. That is to say, the function to be achieved by the programs is generated on the main storage device 302.

A part of the functions of the display control system 100 may be achieved by hardware such as an integrated circuit (IC). The IC is a processor that executes the dedicated process, for example.

When the functions are achieved using a plurality of processors, each processor may achieve one of those functions or two or more of the functions.

The display control system 100 may operate in an arbitrary mode. The display control system 100 may operate as a cloud system on the network, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display control system comprising:
   a recognizer configured to recognize sound generated from a sound source;
   a calculator configured to calculate a first direction of the sound source with respect to a location of a user based at least in part on the recognized sound, the location of the user being different from a location of the sound source; and a display controller configured to cause a display to output display information as text that visually expresses the sound in a first display format comprising a first text rotation angle with respect to a reference plane, the first display format determined based at least in part on an angle between a second direction in which the user faces and the first direction of the sound source, wherein the display controller divides an area surrounding the user into a plurality of sectors in such a manner to make one revolution in a clockwise direction or in a counterclockwise direction around the user, and when the second direction in which the user faces and the first direction of the sound source are within the same sector of the plurality of sectors, the display controller causes the display to output the display information in a second display format comprising a second text rotation angle with respect to the reference plane, the second text rotation angle being different from the first text rotation angle.

2. The system according to claim 1, wherein when recognizing the sound as voice, the recognizer acquires text information expressing the voice, and the display controller causes the display to output the text information as the display information.

3. The system according to claim 1, wherein when recognizing the sound as voice, the recognizer acquires text information expressing the voice, the first display format has a figure that is formed depending at least in part on the angle between the first direction and the second direction, and the second display format has the text information.

4. The system according to claim 1, wherein when recognizing the sound as voice, the recognizer acquires text information expressing the voice, the first display format has text information that is formed depending at least in part on the angle between the first direction and the second direction; and the second display format has the text information that is formed independent of the angle.

5. The system according to claim 1, wherein the first direction of the sound source is represented as a sound source direction vector indicating the first direction from an original position at which the user is present, and the first display format is determined based at least in part on the angle between the sound source direction vector and a reference direction vector indicating the second direction in which the user faces.

6. A display control method comprising:

recognizing sound generated from a sound source;

calculating a first direction of the sound source with respect to a location of a user based at least in part on the recognized sound, the location of the user being different from a location of the sound source;

causing a display to output display information as text that visually expresses the sound in a first display format comprising a first text rotation angle with respect to a reference plane, the first display format determined based at least in part on an angle between a second direction in which the user faces and the first direction of the sound source;

dividing an area surrounding the user into a plurality of sectors in such a manner to make one revolution in a clockwise direction or in a counterclockwise direction around the user; and when the second direction in which the user faces and the first direction of the sound source are within the same sector of the plurality of sectors, causing the display to output the display information in a second display format comprising a second text rotation angle with respect to the reference plane, the second text rotation angle being different from the first text rotation angle.

7. A computer program product comprising a non-transitory computer-readable medium including programmed instructions, wherein the programed instructions, when executed by a computer, cause the computer to perform:

recognizing sound generated from a sound source;

calculating a first direction of the sound source with respect to a location of a user based at least in part on the recognized sound, the location of the user being different from a location of the sound source;

causing a display to output display information that visually expresses the sound in a first display format comprising a first text rotation angle with respect to a reference plane, the first display format determined based at least in part on an angle between a second direction in which the user faces and the first direction of the sound source;

dividing an area surrounding the user into a plurality of sectors in such a manner to make one revolution in a clockwise direction or in a counterclockwise direction around the user; and when the second direction in which the user faces and the first direction of the sound source are within the same sector of the plurality of sectors, causing the display to output the display information in a second display format comprising a second text rotation angle with respect to the reference plane, the second text rotation angle being different from the first text rotation angle.

* * * * *